US010036473B2

(12) United States Patent
Peters (10) Patent No.: US 10,036,473 B2
(45) Date of Patent: Jul. 31, 2018

(54) SEALING PROFILE AND SYSTEM FOR SEALING A CLAMP (71) Applicant: MULTIPOND Wägetechnik GmbH, Waldkraiburg (DE)

(72) Inventor: Andreas Peters, Aschau am Inn (DE)

(73) Assignee: MULTIPOND WÄGETECHNIK GMBH, Waldkraiburg (DE)

( * ) Notice: Subject to any disclaimer, the term of this patent is extended or adjusted under 35 U.S.C. 154(b) by 474 days.

(21) Appl. No.: 14/642,067

(22) Filed: Mar. 9, 2015

(65) Prior Publication Data
US 2015/0260289 A1 Sep. 17, 2015

(30) Foreign Application Priority Data

Mar. 12, 2014 (EP) .................................. 14159203

(51) Int. Cl.
*F16J 15/10* (2006.01)
*F16B 7/04* (2006.01)
(52) U.S. Cl.
CPC ............... *F16J 15/104* (2013.01); *F16B 7/04* (2013.01); *F16B 7/0493* (2013.01); *Y10T 403/52* (2015.01)
(58) Field of Classification Search
CPC .... F16B 2/06; F16B 2/065; F16B 7/04; F16B 7/044; F16B 7/048; F16B 7/0493; F16B 9/023; Y10T 403/7129; Y10T 403/7135; Y10T 403/7141; Y10T 403/7171; Y10T 403/7182; Y10T 403/7188;
(Continued)

(56) References Cited

U.S. PATENT DOCUMENTS 3,807,435 A * 4/1974 Fenster .................. F16L 41/12
137/317
3,849,008 A * 11/1974 Boucher .................. B62J 1/06
297/215.13
(Continued)

FOREIGN PATENT DOCUMENTS

DE          2104141 A1     8/1972
DE     202005013777 U1    11/2005
EP          1754893 A2     2/2007

OTHER PUBLICATIONS

Extended European Search Report dated Aug. 13, 2014 for the Corresponding European Patent Application No. 14159203.0.

*Primary Examiner* — Michael P Ferguson
(74) *Attorney, Agent, or Firm* — Hassan Abbas Shakir; Katten Muchin Rosenman LLP (57) ABSTRACT A sealing profile is used in a clamp. The clamp includes two circumferential sealing sections and a connection section and is designed that the circumferential sealing sections classed the part to be clamped and therefore seal the gap between the clamping means and the part to be clamped, and the connecting section finishes with the outer contours of the clamping sections and therefore seal the clamping slits between the clamping sections of the clamping means to the other side. The sealing section contributes to the hygienic design of cross-clamps and can be used in cross-clamps of clamping parts in the food industry or food processing industry. The continuous sealing profile permits cavities and gaps to be sealed to prevent a microorganism growth and ensures that the part of the plant is easy to clean without leaving cleaning agent residue to accumulate.

8 Claims, 9 Drawing Sheets

(58) Field of Classification Search
CPC ......... Y10T 403/7194; Y10T 403/5761; Y10T 403/5766; Y10T 403/5781
See application file for complete search history.

(56) References Cited

U.S. PATENT DOCUMENTS

| | | | | |
|---|---|---|---|---|
| 5,066,053 | A * | 11/1991 | Miller | F16L 55/17 277/616 |
| 6,131,957 | A * | 10/2000 | Saito | F16L 21/04 285/133.21 |
| 6,896,438 | B1 * | 5/2005 | Chen | B62K 19/36 403/290 |
| 9,638,365 | B1 * | 5/2017 | Reviel | F16B 7/048 |
| 2011/0049868 | A1 * | 3/2011 | Mori | F16B 2/10 285/188 |

* cited by examiner

SEALING PROFILE AND SYSTEM FOR SEALING A CLAMP

BACKGROUND OF THE INVENTION

1. Field of the Invention

The present invention relates to a sealing profile for use in a clamp in order to clamp parts in the clamp and thereby seal all cavities or gaps.

2. Description of the Related Art

In particular in the food industry or food processing industry, single production or processing steps can have different requirements for the hygienic design of plants. Non-hygienic constructions can increase the risk of a contamination by microorganisms, as well as the introduction of contaminations, for example from food from a former processing step, which has been performed in the same plant. The basic principle of the hygienic design is, however, that all equipment or plant parts cannot be polluted via an increase in the concentration of microorganisms, dirt, insects, other vermin or other contaminations, which can often accumulate in recesses, gaps, slits, holes, dead volumes and exposed threads.

Plants and parts of plants in the food industry often comprise clamp connections. In this way, profiles made of pipe or full material are connected or fixed with clamp connections. It has to be possible to move clamp connections along the profiles without steps, if they are not in the tensioned state. Different embodiments of clamp connections are known. A common clamp connection can be performed by a metal part with clamping means for clamping of clamped parts. The clamping occurs via tightening of a screw between two clamping sections of a clamp connection means. In a part of a plant, multiple clamping means can be present, for example in a cross-clamp. To perform a force-locking clamping, a clamping slit must be present between the clamping sections of the clamp connection means, and the clamping sections must be connected via a screw and must be clampable, to perform a clamping or to release it. If the screw, which connects both clamping sections, is tightened, the clamping slit between both opposing clamping sections will become narrower, whereby the clamping of the clamped part is performed.

If a cross-clamp is mounted, double areas metal/metal, which are not sealed, and cavities and depressions (e.g. the clamping slit) are present. Those are only very deficiently cleanable. A self-induced draining of adhering liquids, e.g. via condensation of production remainders, is also not possible.

Such a part therefore comprises clear disadvantages for the use in the food industry or food processing industry.

It is an objective of the present invention to provide a sealing profile for a connection member, in particular a cross-clamp, being hygienically designed and usable in a plant of the food industry or food processing industry. Main aspects are a simple possibility of cleaning, the protection of the product regarding contamination, and the prevention of the accumulation of dirt, microorganisms, insects and other vermin. It is therefore necessary to provide a sealing for a connecting part, in order that this can be used without gaps and further cavities, in which dirt, bacteria or the like can accumulate.

SUMMARY OF THE INVENTION

This objective is solved by a sealing profile for sealing of a clamping means with a circumferential section and two opposing clamping sections, between which there is a clamping slit for clamping of clamped parts, wherein the sealing profile seals both the clamping slit between the clamping sections and profile slits between the circumferential sections and clamping sections and the clamp parts without any gaps, and the sealing profile comprises two circumferential sealing sections and at least one connecting section, wherein the circumferential sealing sections clasp the outer circumference of the clamped part and the connecting section connects both circumferential sealing sections and is formed in a way, that it is adapted to the outer contour of the clamping sections and finalizes with them, wherein the sealing profile is formed continuously and in one part.

This objective is also solved by a system comprising a clamping means and sealing profile according to one of the preceding claims, wherein a recess is provided in the clamping means, of which the circumferential sealing sections of the continuous sealing profile are includable and system of clamping means and sealing profile according to claim 8, wherein the clamping means is sealed by the sealing profile both in the tightened and the untightened state by means that the circumferential sealing sections are formed via pretension in a way, that they fit tightly to the clamped part.

This objective is also solved by a clamp connection means comprising two or more systems consisting of clamping means and sealing profile as described above.

The objective is also permits use of a system of clamping means and sealing profile as described above in a plant part in the food processing industry and especially in that the plant part is used in a weighing device, preferably in a combination weighing device.

The invention contains a sealing profile, which is used in a connecting part or clamp with one or more clamping means. This sealing profile is manufactured continuously of one part and encloses the clamped part on both sides of the clamp means and seals the gaps between the clamp part and the clamping means without any gaps, and further fills the clamping slit completely. The continuous sealing profile can be inserted into the clamping means, for example into a respective recess, which is provided in the clamping means for this reason.

By the use of this continuous sealing profile, a clamping connection is realizable in a way, that in a connecting part, for example a cross-clamp, no gaps, grooves, other dead volume parts or recesses are present, in which condensed water or remainders of the product or other dirt could accumulate, as all gaps or cavities are filled (e.g. the clamp slit) or sealed (e.g. gap between clamp connection means and clamped part). Furthermore, by the use of the continuous sealing profile, no threads are exposed, as those are enclosed by the continuous sealing profile. It is furthermore ensured that a connecting part can be cleaned easily, without the possibility that liquid or detergent remainders are retained in cavities, which could contaminate the product during the production process. Plant parts, provided with the continuous sealing profile, can therefore be used in open processes of the food industry or food processing industry, as hygienic risks because of e.g. recesses and gaps can be decreased.

BRIEF DESCRIPTION OF THE DRAWINGS

In the following, a preferred embodiment will be further explained with reference to the enclosed drawings.

DETAILED DESCRIPTION OF THE INVENTION

First Embodiment

Figure 1:
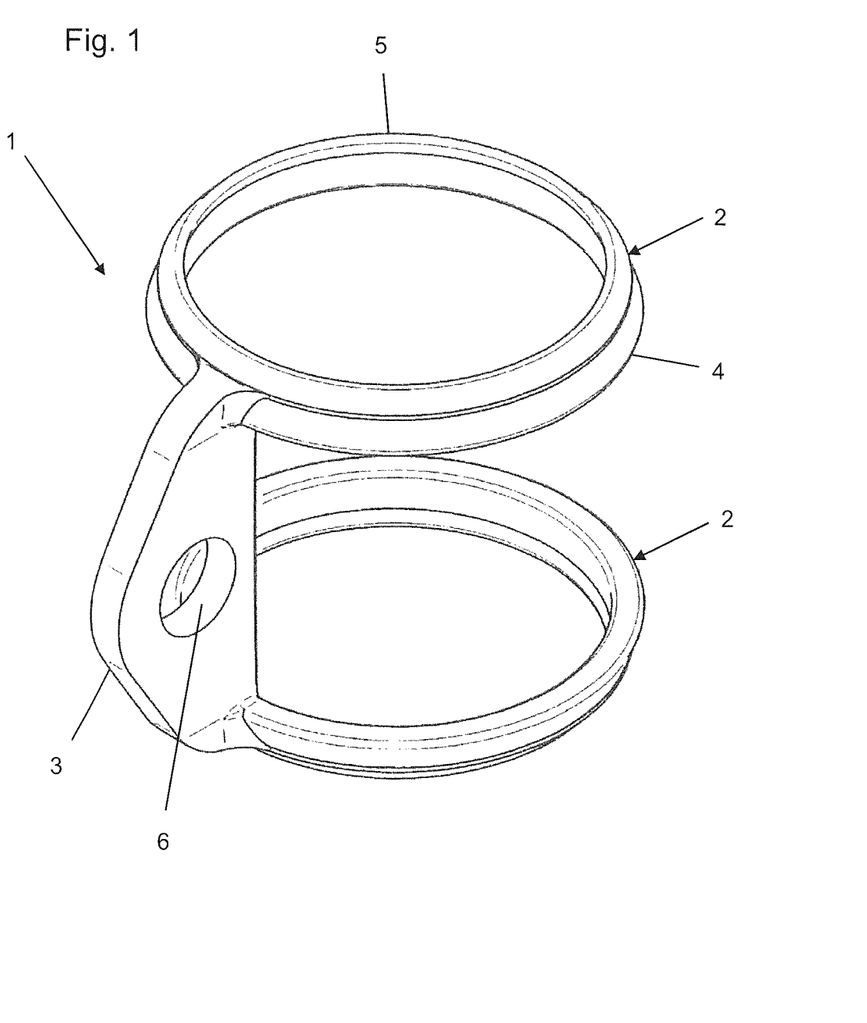
FIG. 1 is an isometric view of the continuous sealing profile.

FIG. 1 shows the continuous sealing profile 1 with two circumferential sealing sections 2 and a connecting section 3. Herein, it becomes apparent that the cross-section of the circumferential sealing sections 2 is split into two parts in this embodiment. The circumferential sealing sections 2 have a v-shaped lower section 4 and circumferential sealing lips 5 as upper section. The circumferential sealing lips 5 are formed slightly inclined in the direction of the inner side of the circumferential sealing section. Therefore, the circumferential sealing lips are slightly pre-biased towards the inner side, so that they are slightly pushed outwards or upwards while introducing a part 12 to be clamped. The connecting section 3 has a disk-shaped recess 6, through which a screw can be inserted.

Figure 2:
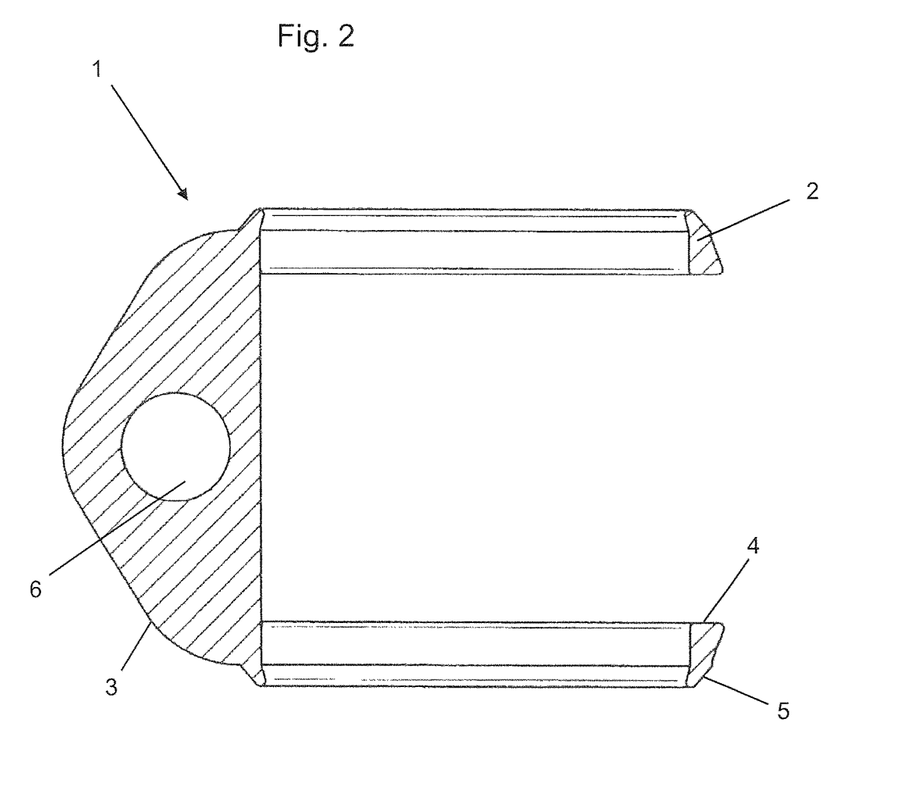
FIG. 2 is a sectional view of the continuous sealing profile.

FIG. 2 shows a sectional view of the continuous sealing profile, which in turn shows the disk-shaped recess 6 in the connecting section 3. With this figure, the cross-section of the circumferential sealing sections 2 is again illustrated. The v-shaped lower section 4 and the circumferential sealing lips 5 put thereon are presented in detail. With this figure, it becomes in particular clear that the inner circumferential area of the circumferential sealing sections 2 is no plane area, but two areas are present, which form an inner angle between 90° and 180° between each other. If a part 12 to be clamped is inserted into the circumferential sealing sections 2, the circumferential sealing lip 2 can bend up, so that the inner circumferential area of the circumferential sealing sections 2 represents a plane area (180°) in an optimal case.

Figure 3:
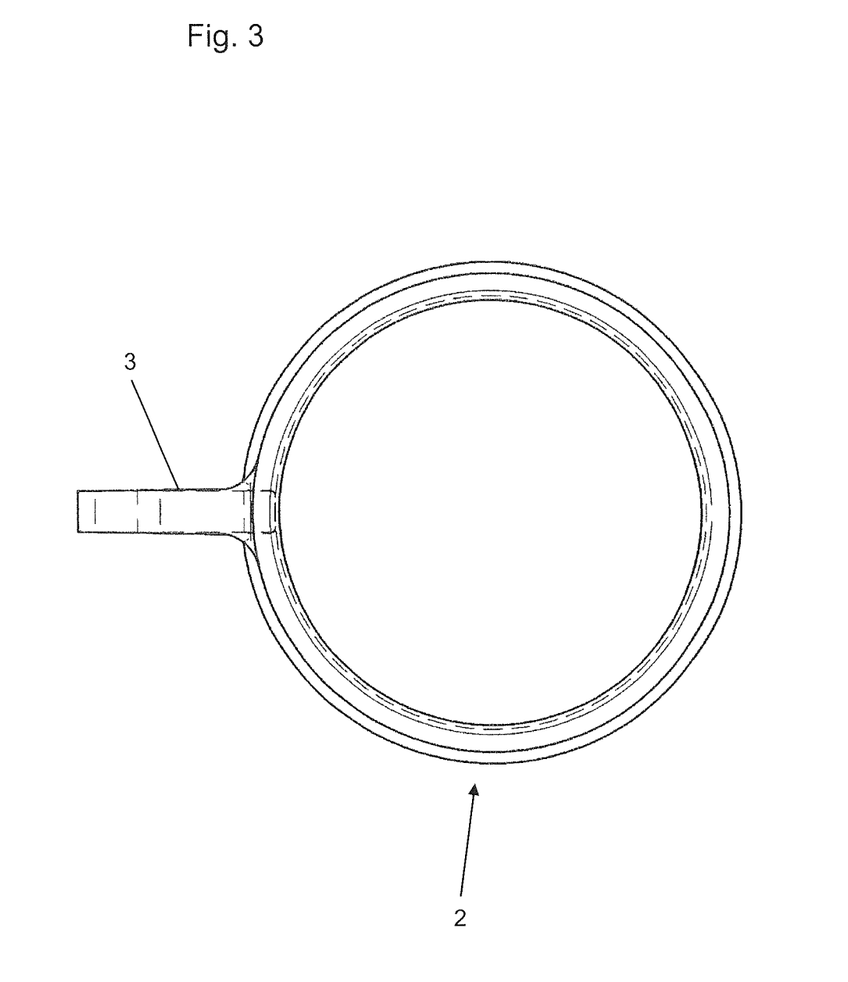
FIG. 3 is a top view from above on the continuous sealing profile.
Figure 4:
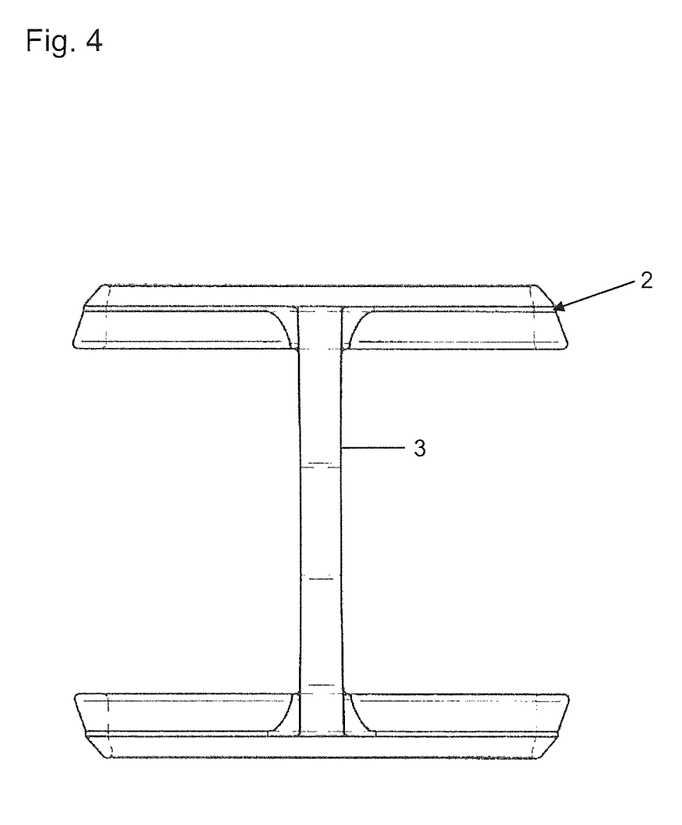
FIG. 4 is a side view of the continuous sealing profile 1.

FIG. 3 and FIG. 4 illustrate in particular the design of the connection of the circumferential sealing sections 2 and the connecting section 3, especially the reinforcement of the connecting section 3 in the transition between connecting section 3 and the circumferential sealing sections 2 via a tangentially constant transition.

Figure 5:
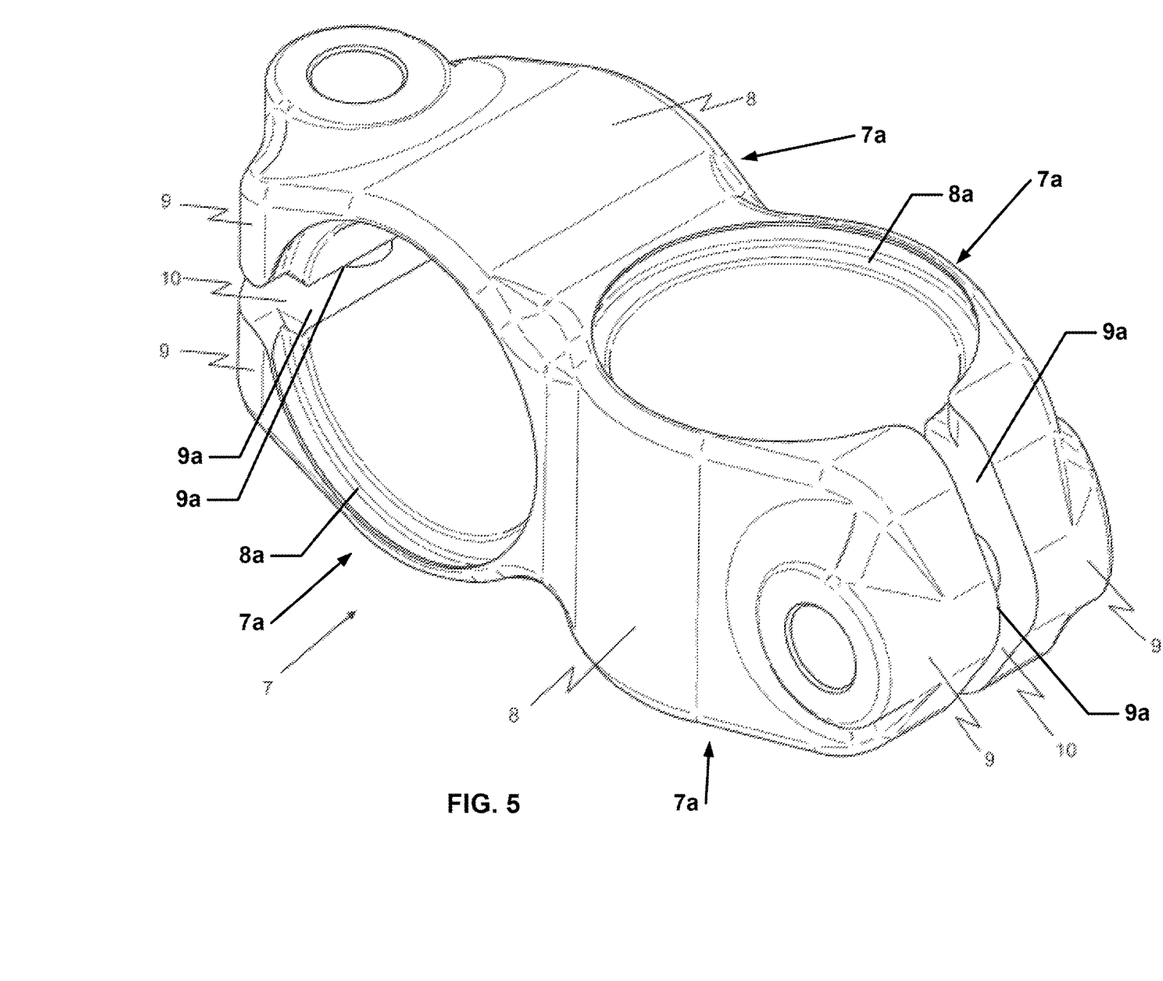
FIG. 5 is a schematic configuration view of a cross-clamp without sealing profile.

FIG. 5 shows a molded cross-clamp with two clamping means 7, i.e., clamping portions 7 each of which have transverse ends 7a. The clamping portions comprise a circumferential section 8 and two opposing clamping sections 9, wherein a profile slit 8a is disposed in the circumferential section 8 and the clamping sections 9 and a clamping slit 10 lies between end sections 9a of the clamping sections 9. Both clamping sections 9 are connected via a screw (not illustrated here).

Figure 6:
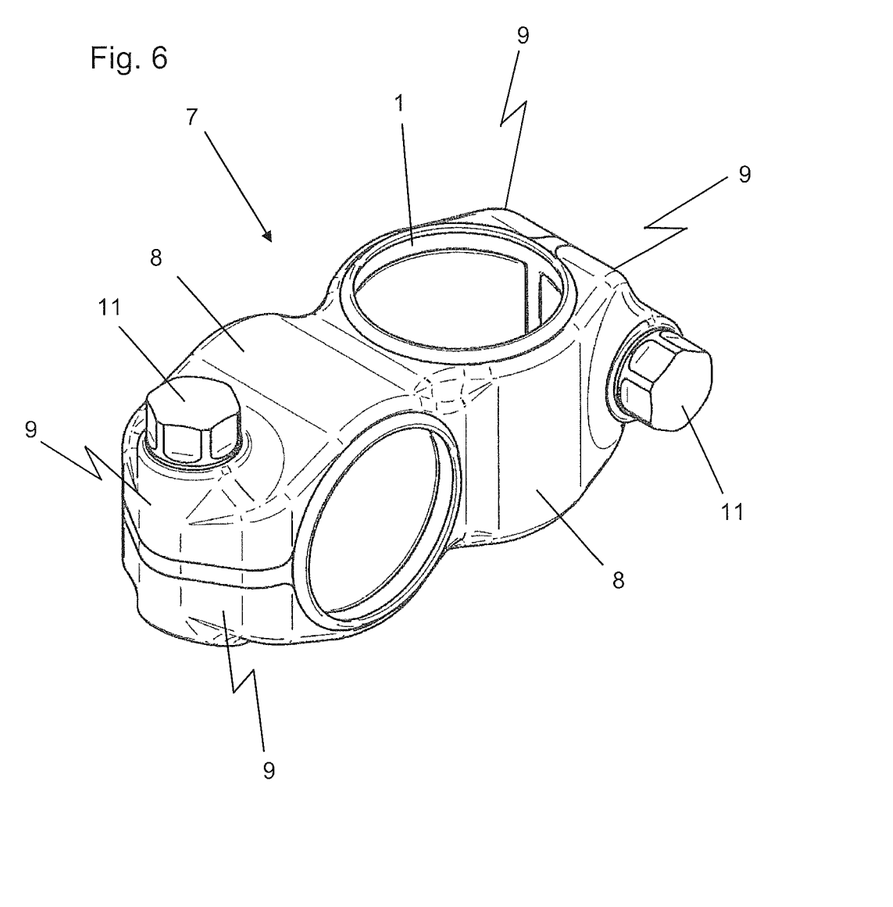
FIG. 6 is a schematic configuration view of a cross-clamp including the continuous sealing profile according to the present invention.

FIG. 6 shows the continuous sealing profile 1, which is inserted into a molded cross-clamp. The continuous sealing profile 1 is inserted into the clamping means 7 in such a way, that a part of the circumferential sealing section 2 of the continuous sealing profile 1 protrudes over the outer contour of the clamping means 7. Further it is obvious that the circumferential sealing section 2 is formed with a circumferential sealing lip 5. The connecting section 3 is positioned between two clamping sections 9 of the clamping means 7.

Figure 7:
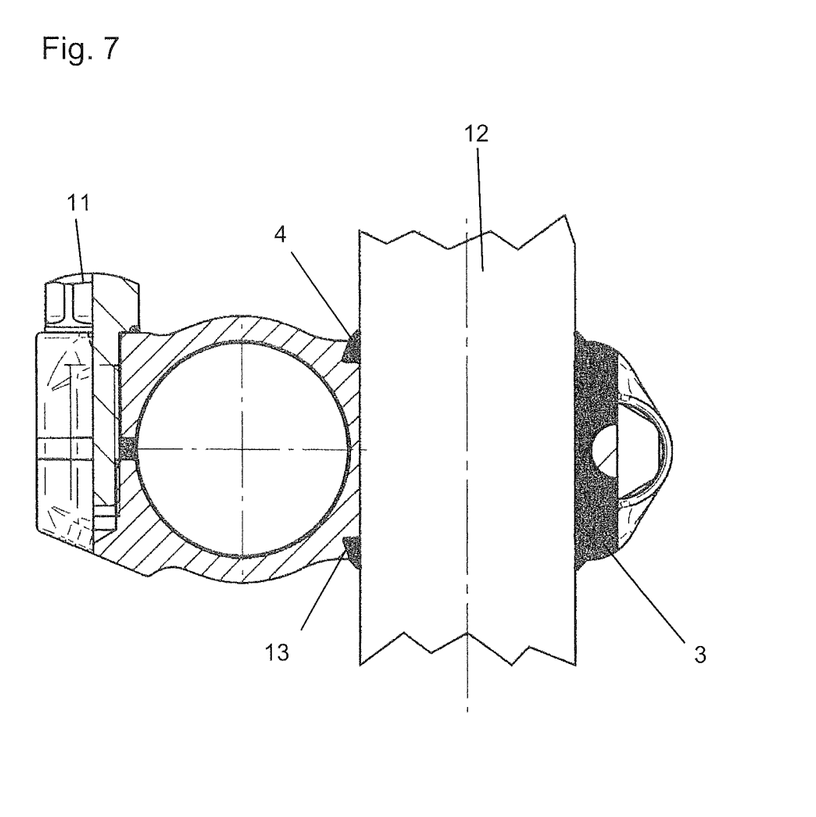
FIG. 7 is a sectional view of a cross-clamp, which includes two continuous sealing profiles (one sealing profile per clamp connection).

FIG. 7 shows a sectional view of the clamping means 7, which includes the continuous sealing profile 1. Herein it is clear that in the clamping means 7 a recess 13 is present at the bore for the part to be clamped 12, respectively, which includes a part of the circumferential sealing section 2 of the continuous sealing profile 1. Herein, the lower area of the circumferential sealing section 2 of the continuous sealing profile 1 lies completely on the bottom area of the recess 13. A part of the circumferential sealing section 2 of the continuous sealing profile 1, namely the circumferential sealing lip 5, protrudes over the outer contour of the clamping means. The circumferential sealing section 2 however fits completely to the part to be clamped 12 with its inner circumferential area. Further, in this embodiment, the connecting section 3, which connects both circumferential sealing sections 2, fills the whole area between end sections 9a of the clamping sections 9 of the clamping means 7, that means the whole clamping slit 10. In this connecting section 3, a disk-shaped recess 6 is provided, which is as large as the outer diameter of a screw 11, which is provided for tightening the clamping sections 9 of the clamping means 7. Further, the connecting section 3 is formed in a way, that completely it fits with a side area to the part 12 to be clamped.

Figure 8:
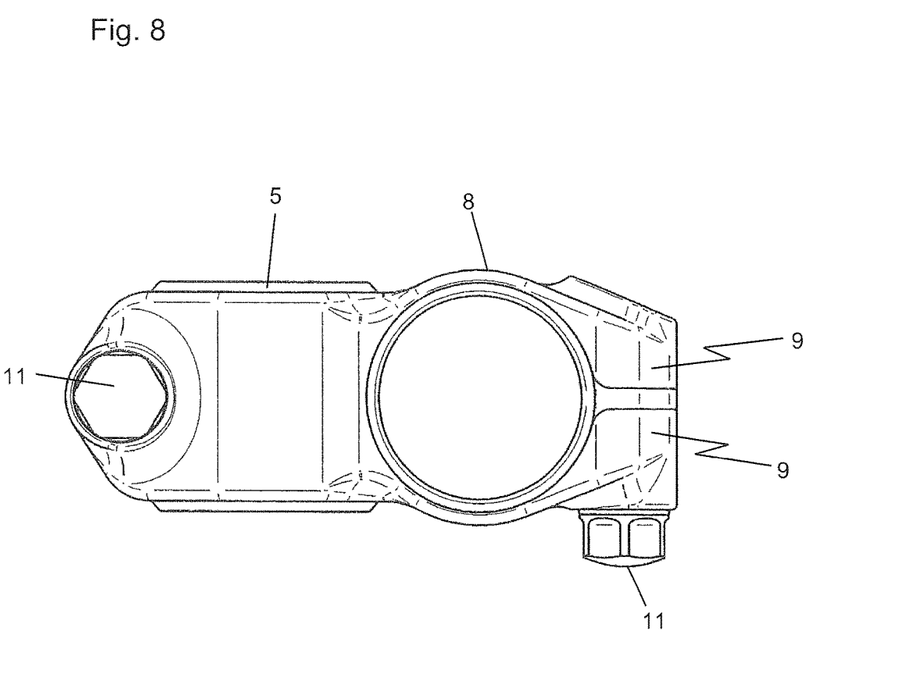
FIG. 8 is a top view on a cross-clamp, which includes two continuous sealing profiles 1 (one sealing profile per clamp connection).

FIG. 8 shows a top view on the continuous sealing profile 1, which is inserted into a cross-clamp made of cast. Herein, the arrangement of both circumferential sealing sections 2 and the connecting section 3 is clarified. Herein, the connecting section 3 is formed at the transition to a circumferential sealing section 2 with a radius without a sharp edge, wherein a tangentially constant transition is ensured. The connecting section 3 is further slightly thicker at the transition to a circumferential sealing section 3, which leads to an improved stability and tear-resistance, and is in this way further fitted to the shape of the clamping means 7. By tightening of the clamping sections 9 by tightening the screw 11 for force transfer to the part 12 to be clamped, it has to be possible, that the thickness of the connecting section 3 is variable, that means, changes dependently on the width of the clamping slit 10. By various tightening of the clamping sections 9, the circumferential sealing sections 2 have further to be elastic, to adapt to the shape of the circumferential sections 8 and clamping sections 9 of the clamping means 7 at each tensile state of the clamping sections 9 of the clamping means 7, without forming gaps or recesses. The circumferential sealing sections 2 have therefore to be variable in their cross-section, that means, to be elastic.

Figure 9:
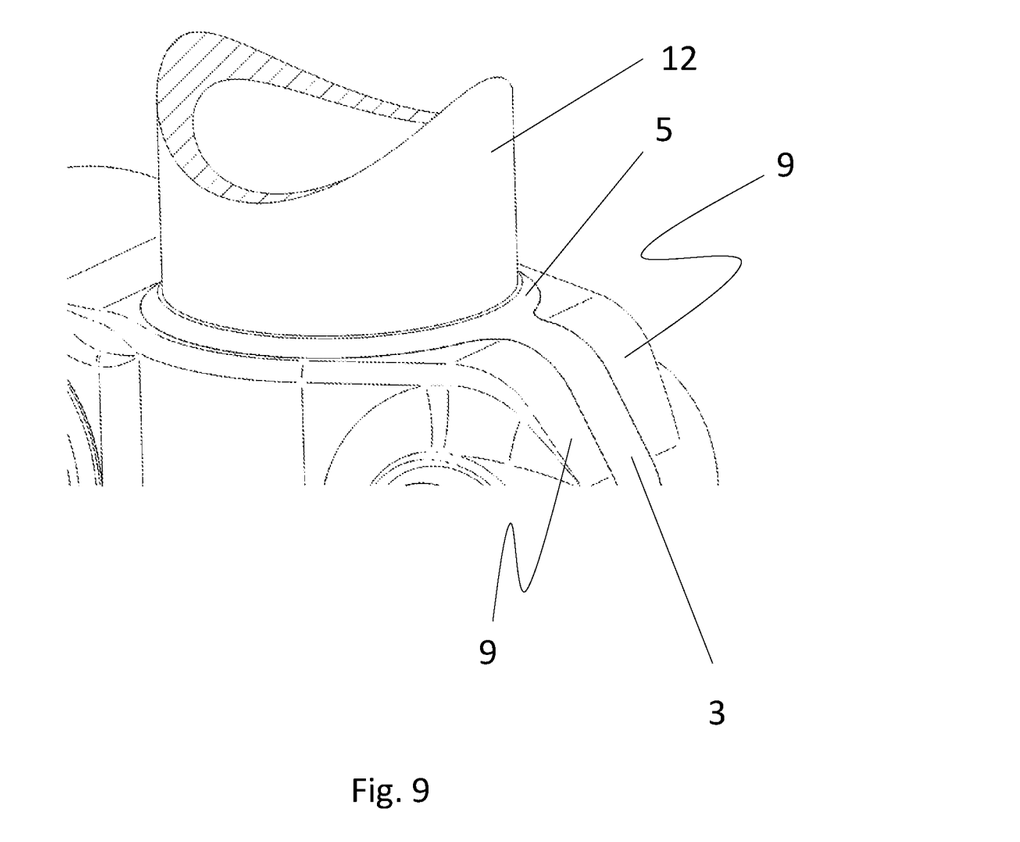
FIG. 9 is a detail from the schematic configuration view of a continuous sealing profile, used in a clamp connection between clamping means and the part to be clamped.

In FIG. 9, an enlarged section of a system consisting of clamping means 7 made of cast and continuous sealing profile 1 is shown, which has in this case included a part 12 to be clamped. As obvious from this figure, the lower section 4 is inserted into one circumferential sealing section 2 via the recess 13 of the clamping means 7, wherein the circumferential sealing lip 5 is only positioned above the clamping means 7 and therefore is not in direct contact thereto. In this way, the clamping means 7 does not impose direct compression forces to the circumferential sealing lip 5 of the circumferential sealing section 2. Because of the pre-tension, the circumferential sealing 2 fits, however—in the tightened and in the untightened state—tightly on the clamping section 9 of the clamping means 7. If the lower section 4 of the circumferential sealing section 2 is compressed strongly, the circumferential sealing lip 5 still lies tightly on the part 12 to be clamped via its pre-tension in the non-compressed state, so that no gaps can be formed.

The continuous sealing profile 1 can for example be manufactured via injection moulding or 3D-printing. Alternatively, a "moulding around" the clamping means 7 including the clamped part 12 is possible.

In a connecting part or a plant part, two or more clamping means 7, which are respectively provided with one continuous sealing profile 1, can be provided. A connection part, for example a cross-clamp with two clamping means 7, can for example be formed by cast.

Second Embodiment

A second embodiment is similar to the first embodiment regarding its structure and its design. The lower section 4 of the circumferential sealing section 2 is however formed with barbs for the purpose of better fixation, which fix the continuous sealing profile 1 in a clamping means 7. The recess in the clamping means 7 is respectively designed, so that the barbs can be included therefrom.

Further Embodiments

The present invention is not limited to the above-mentioned embodiments. For example it would be possible that the circumferential sealing sections 2 of the continuous sealing profile 1 have a disc-shaped profile and therefore have the shape of an O-ring. Furthermore it is possible that the part 12 to be clamped has no round profile, as presented in the figures. Furthermore, triangular, quadratic or multi-sided profiles of the part 12 to be clamped are possible, wherein the circumferential section 8 and the clamping sections 9 of the clamping means 7 have to be respectively adapted thereto. The circumferential sealing section 2 of the continuous sealing profile 1 would have to be adapted in its shape as well.

The present invention relates to a continuous sealing profile 1 for use in a clamping means 7, the sealing profile 1 consisting of two circumferential sealing sections 2 and a connection section 3 and is designed in a way, that the circumferential sealing sections 2 clasp the part to be clamped 12 and therefore seal the gap between the clamping means 7 and the part 12 to be clamped, and the connecting section 3 finishes with the outer contours of the clamping sections 9 and therefore seals the clamping slit 10 between the clamping sections 9 of the clamping means 7 to the outer side. The present invention contributes to the hygienic design of cross-clamps and can be used for example in cross-clamps of plant parts of the food industry or food processing industry. By the continuous sealing profile 1, cavities and gaps are sealed to inter alia prevent a growth of microorganisms and to ensure that the part of the plant is easy to clean, without the possibility that remainders of detergents or the liker can accumulate.

The invention claimed is:
1. A system for sealing a clamping portion, the system comprising:
 a clamping portion of a clamp, the clamp for clamping at least two mechanical parts together, the clamping portion comprising:
 a clamping body having a circumferential section comprising an annular wall having a longitudinal axis and a pair of transverse end faces;
 a clamping slit extending through the annular wall and between the transverse end faces, the clamping slit defining a pair of circumferentially opposing clamping sections for clamping one of the mechanical parts, each clamping section having an axially extending end face opposing the axially extending end face of the other clamping section, each clamping section having an outer face disposed at an outer peripheral surface of the annular wall;
 and
 a pair of annular sealing grooves, each sealing groove disposed proximate a respective transverse end face of the clamping portion, each sealing groove disposed in the circumferential section and the pair of clamping sections; and
 a sealing profile comprising:
 a pair of annular circumferential sealing sections, each circumferential sealing section disposed in a respective sealing groove and extending through the respective transverse end face of the clamping portion to seal the transverse end face against the one of the mechanical parts; and
 a connecting section integrally formed with and connecting one circumferential sealing section to the other circumferential sealing section, the connecting section disposed in the clamping slit between the axially extending end faces of the clamping sections to seal the clamping slit when the pair of clamping sections clamp the one of the mechanical parts;
 wherein the connecting section aligns with the outer faces of the clamping sections to seal the clamping slit between the clamping sections of the clamp to the outer peripheral surface of the annular wall of the clamping portion;
 wherein the connecting section extends to the outer face of each respective clamping section and fills an entire area between the clamping sections of the clamping portion between the transverse end faces, which defines an entirety of the clamping slit.

2. The system of claim 1, wherein the connecting section seals the clamping slit when the pair of clamping sections clamp the one of the mechanical parts by being tightened.

3. The system of claim 1, wherein the connecting section seals the clamping slit when the pair of clamping sections clamp the one of the mechanical parts while being untightened.

4. The system of claim 3, wherein at least one of the circumferential sealing sections is formed via pre-tension to fit tightly to the one of the mechanical parts.

5. The system of claim 1,
 further comprising the at least two mechanical parts.

6. A system for sealing a clamp, the system comprising:
 a clamp for clamping at least two mechanical parts together, the clamp comprising a plurality of clamping portions, each clamping portion comprising:
 a clamping body having a circumferential section comprising an annular wall having a longitudinal axis and a pair of transverse end faces;
 a clamping slit extending through the annular wall and between the transverse end faces, the clamping slit defining a pair of circumferentially opposing clamping sections for clamping one of the mechanical parts, each clamping section having an axially extending end face opposing the axially extending end face of the other clamping section, each clamping section having an outer face disposed at an outer peripheral surface of the annular wall;
and
a pair of annular sealing grooves, each sealing groove disposed proximate a respective transverse end face of the clamping portion, each sealing groove disposed in the circumferential section and the pair of clamping sections; and a sealing profile comprising:

a pair of annular circumferential sealing sections, each circumferential sealing section disposed in a respective sealing groove and extending through the respective transverse end face of the clamping portion to seal the transverse end face against the one of the mechanical parts; and a connecting section integrally formed with and connecting one circumferential sealing section to the other circumferential sealing section, the connecting section disposed in the clamping slit between the axially extending end faces of the clamping sections to seal the clamping slit when the pair of clamping sections clamp the one of the mechanical parts;

wherein the connecting section aligns with the outer faces of the clamping sections to seal the clamping slit between the clamping sections of the clamp to the outer peripheral surface of the annular wall of the clamping portion;

wherein the connecting section extends to the outer face of each respective clamping section and fills an entire area between the clamping sections of the clamping portion between the transverse end faces, which defines an entirety of the clamping slit.

7. The system of claim 6, further comprising at least two mechanical parts, wherein the at least two mechanical parts are plant parts in a food processing plant.

8. The system of claim 7, wherein the plant parts are used in a combination weighing device.

\* \* \* \* \*